United States Patent Office 3,078,312
Patented Feb. 19, 1963

3,078,312
ISOMERIZATION OF ORGANOBORON
COMPOUNDS
Herbert C. Brown, 1840 Garden, St., West Lafayette, Ind.
No Drawing. Filed Mar. 30, 1960, Ser. No. 18,493
11 Claims. (Cl. 260—606.5)

The present invention is concerned with a process for isomerization, particularly of organoboron compounds into the isomers thereof.

It has recently been discovered that various organoboron compounds can be treated to form isomers thereof by the shifting of the boron atom down a carbon chain. By way of example, tri-sec-pentyl borane when heated at 180° C. for a sufficient period is converted essentially quantitatively to tri-n-pentyl borane. Depending upon the particular organoborane employed, the necessary reaction times will vary. It has also been recently discovered that the boron atom can be moved down a chain past branched chains whereby even primary organoboranes can be converted to other isomeric primary organoboranes. A typical example is the thermal treatment of tri(2-methyl-1-butyl)borane to produce tri(3-methyl-1-butyl)borane.

These significant discoveries are of far reaching application. Thus, it is now possible to react an internal olefin with diborane to form the corresponding secondary or tertiary organoboranes which then can be treated at higher temperatures to convert the secondary or tertiary organoborane to a primary organoborane. Similarly, a branched chain terminal olefin can be reacted with diborane to produce the corresponding primary organoborane which can be heated to result in the isomeric primary organoborane. The resulting primary organoboranes can then be oxidized to form the corresponding primary alcohols. Alternatively, they can be reacted with an olefin to form a different organoborane and to displace the organo groups attached to the boron releasing a terminal olefin wherein the double bond is in a different position than that of the starting olefin. The resultant terminal olefins are more highly desirable than the starting olefins in polymerization reactions leading to fibers.

However, the techniques for isomerizing the organoborane compounds as presently known suffer particular inherent disadvantages. A principal disadvantage, among others, is the feature that the isomerization proceeds with difficulty requiring extensive periods of heating at comparatively high temperatures thereby enhancing degradation of the reactants and products. Further, these isomerizations are particularly difficult where it is desirable to move the boron past a branched chain. Thus, it is difficult by the presently known technique to go from a primary organoborane to a secondary organoborane or to effect the transmission of the boron atom from a primary, secondary, or tertiary position past a branched chain to another primary, secondary, or tertiary position, particularly the primary position. Thus, while the discovery of the isomerization of the organoboron compounds has enhanced the utility of such products in olefin production, alcohol synthesis, or as catalysts for polymerization reactions, it is still highly desirable to further improve upon the reaction so that the process and ultimate uses of the organoboron compounds will be more rapidly and readily realizable in commercial applications.

Accordingly, an object of this invention is to provide unique methods for producing chemical compounds. Another object is to provide a more efficient and economical process for converting organoboron compounds into isomers thereof. A particular object of this invention is to provide an improved process for the conversion of secondary or tertiary organoboron compounds into primary organoboron compounds. A further object is to provide a process for converting primary, secondary, or tertiary organoboron compounds into isomers thereof. A still further object is to provide a method for converting a primary organoboron compound into an isomeric primary organoboron compound. An additional object is to provide a process for the conversion of tertiary organoboron compounds to secondary organoboron compounds or secondary organoboron compounds into isomers thereof. These and other objects of the invention will be evident as the discussion proceeds.

In the isomerization of organoboron compounds for conversion to isomers thereof, it has now been found that the isomerization proceeds more rapidly and effectively if the reaction mixture contains boron-hydrogen bonded moieties. Thus, it has been found that when the isomerization is affected in the initial presence and preferably while maintaining the presence of boron-hydrogen linkages in the system, enhanced results are obtained. The boron-hydrogen linkages are preferably contained in materials having the structure $R_2BH$ where R is preferably analogous to the R groups of the organoboron compound to be isomerized. For practical purposes and best results, it has been found that the ratio of the boron-hydrogen linkages to the total boron-carbon linkages in the reaction system be between about 0.01 to 0.1. The organoboron compound which is to be isomerized preferably has at least one carbon to boron linkage in a straight or branched chain of at least 3 carbon atoms and is one which is capable of migration of the boron to other carbon atoms than that to which it was originally attached. The process is especially applicable in the conversion of secondary or tertiary organoboron compounds where the organo groups are straight or branched chain and in the conversion of primary organoboron compounds where the organo group is an asymmetrical branched chain. The process is also particularly advantageous when only hydrocarbon radicals, especially alkyl, are bonded to the boron in the organoborane to be treated. The process is especially applicable to the treatment of tri(2-methyl-1-butyl) borane, tri(2-methyl - 2 - butyl)borane, tri(3-methyl-2-butyl)borane, tri(2-methyl-2-pentyl)borane, tri(3-methyl-2-pentyl)borane, tri(3-methyl - 3 - pentyl)borane, tri(2-methyl-3-pentyl)borane, tri(4-methyl - 2 - pentyl)borane, and tri(2-methyl-1-pentyl)borane or mixtures of these compounds having the same number of carbon atoms in each radical or compounds having mixtures of such radicals. Particular advantage is also obtained when the treatment of the organoborane in the presence of the boron-hydrogen moiety is conducted at temperatures between about 160 to 220° C. Likewise, further advantage of fast isomerization is obtained when supplemental catalysts are also employed in the reaction mixture, particularly the hydrocarbon ethers. Thus, one particularly preferred embodiment of this invention comprises the treatment of tri(2-methyl-1-butyl)borane, tri(2-methyl-2-butyl)borane, tri(3-methyl-2-butyl)borane, tri(2-methyl-2-pentyl)borane, tri(3-methyl - 2 - pentyl)borane, tri(3-methyl - 3 - pentyl)borane, tri(2-methyl-3-pentyl)borane, tri(4 - methyl - 2 - pentyl)borane, tri(2 - methyl-1-butyl)-borane, or mixtures of such at 160 to 220° C. in the presence of a boron-hydrogen bonded moiety, preferably $R_2BH$ wherein the R groups are analogous to the R groups attached to the organoborane treated, in a ratio of 0.01 to 0.1 of boron-hydrogen bonds to boron-carbon bonds. Another particular embodiment is the conductance of the preceding reaction in the further presence of at least a minor amount of an ether, especially the dimethyl ether of diethylene glycol, the diethyl ether of diethylene glycol, methyl ethyl ether of diethylene glycol, diethyl ether, and tetrahydrofuran. Other particular embodiments of the invention will be brought forth hereinafter.

The present invention is of particular advantage in that the conversion of organoboron compounds into isomers thereof is accomplished in a more rapid and efficient manner, or alternatively at substantially lower temperatures for the same periods to achieve the same production. For example, the secondary or tertiary organoboron compounds are more rapidly converted to primary organoboron compounds according to the present invention. Thus, an internal olefin can be more readily converted to a terminal olefin by forming first the secondary or tertiary organoborane, then treating it according to the process of the present invention, and subsequently reacting it with an olefin to displace the desired terminal olefin. Further, the least desirable branched chain organoboranes can be converted to more desirable isomers thereof more efficiently. By way of illustration, a terminal branched alpha-olefin can be reacted with diborane to form the corresponding branched chain primary organoborane which can then be treated according to the present process to result in a branched chain primary organoborane wherein the boron atom is now attached to a different terminal carbon atom and the resulting product can then be reacted with an olefin to result in the displacement and recovery of a terminal olefin wherein the olefinic linkage is now in a new location in the chain between the alpha and beta carbon atoms attached to the boron prior to the displacement operation. These and other advantages of the present invention will be brought forth hereinafter.

The present invention will be more readily understood from the following examples illustrating various embodiments thereof wherein all parts are by weight.

EXAMPLE I (A) Into a reactor equipped with internal agitation, external heating means and a means for maintaining a nitrogen atmosphere was added 74.4 parts of tri(2-methyl-1-butyl)borane and 10.6 parts of di(2-methyl-1-butyl)-boron hydride along with 108 parts of the diethyl ether of diethylene glycol. Thus, the ratio of boron-hydrogen bonds to total boron-carbon bonds in the system was 0.06. This mixture was heated to 150° C. and maintained at that temperature for 23 hours. At the end of this period, an aliquot sample of the reaction mixture was oxidized with alkaline hydrogen peroxide and then hydrolyzed to form the corresponding alcohols. It was found that 55 parts of 3-methylbutanol-1, 44 parts of 2-methylbutanol-1, and 1 part of 3-methylbutanol-2 were obtained. Further reflux of the reaction mixture for several days produced no change in composition. Thus, it was shown that essentially a 100 percent isomerization from the 2-methyl-1-butyl boranes to the equilibrium mixture of the methylbutyl boranes corresponding to the above alcohols was obtained.

(B) The above procedure was repeated with exception that the temperature employed was 175° C. for a period of 2 hours. In this run, an 84 percent isomerization from the 2-methyl-1-butyl boranes to the equilibrium mixture of methylbutyl boranes was obtained thus illustrating both the effect of temperature and the catalysis of the boron-hydride bonds.

(C) In contrast to the above results, the procedure was repeated with exception that prior to heating the mixture to affect the isomerization, it was treated with 15 parts of 2-methyl-1-butene to alkylate all of the boron-hydrogen linkages. Analysis of an aliquot of the resulting mixture showed essentially no boron-hydrogen linkages. When the resulting mixture was heated at 185° C. for 24 hours, only 9 percent isomerization of the tri(2-methyl-1-butyl)-borane to the equilibrium mixture of the methylbutyl boranes was obtained. Thus, even the employment of a higher temperature, which would be expected to increase the rate of isomerization, still did not produce more than about 10 percent of the isomerization accomplished in the above runs wherein the boron-hydride bonded catalyst was present.

EXAMPLE II (A) Employing the procedure of Example I, a mixture of 53.3 parts of tri(3-methyl-2-butyl)borane and 32.3 parts of di(3-methyl-2-butyl)boron hydride, boron-hydrogen to boron-carbon ratio of 0.185, in 108 parts of the diethyl ether of diethylene glycol was heated at 100° C. for 7 hours. In this manner, the resulting product showed a 32 percent isomerization to the equilibrium mixture of the methylbutyl boranes as described in Example I-A.

(B) When the above run was repeated with exception that the diethyl ether of diethylene glycol was not employed as solvent, a 30 percent isomerization was achieved.

EXAMPLE III (A) Employing the procedure of Example I-A with exception that 15.8 parts of tri(2-methyl-1-butyl)borane and 6.7 parts of di(2-methyl-1-butyl)boron hydride, boron-hydrogen to total boron-carbon ratio of 0.145, and 28.5 parts of the diethyl ether of diethylene glycol were heated for 7 hours at 160° C., the percent isomerization obtained was 99 percent.

(B) When this procedure was repeated except that the boron-hydrogen to boron-carbon ratio was 0.022, the percent isomerization was 76 percent.

(C) In contrast to the above results, when both procedures were repeated employing respectively a ratio of 0.150 and 0.039 boron-hydrogen to boron-carbon ratio in the absence of the diethyl ether of diethylene glycol, the percent isomerization obtained was 94 and 72 percent respectively.

Thus, these results indicate the enhanced isomerization obtained by increasing the boron-hydrogen to total boron-carbon bond ratio and by employing also an ether as an additional catalyst. Further, when comparing the results obtained in this example with the results obtained in Example II, the enhancement in isomerization affected because of higher temperature is illustrated.

The present invention is predicted primarily upon the unnprecedented finding that the initial presence of boron-hydrogen bonds when treating organoboranes to affect isomerization enhances the isomerization rate. The manner by which the boron-hydrogen bonds are obtained and included in the reaction mixture is subject to considerable latitude. Thus, in general, all that is required is to employ a compound having at least one boron-hydrogen moiety wherein the remaining valences of the boron are satisfied by organic radicals or hydrogen. By this definition, it is intended, however, to include also dimeric and other polymeric forms of boron compounds. The organoboron hydrides, ($R_2BH$ and $RBH_2$), particularly wherein the organo groups are saturated or aryl hydrocarbon radicals, e.g. alkyl, cycloalkyl, aryl, alkaryl, aralkyl and the like aliphatic and aromatic radicals are included. Typical examples of such compounds include dimethyl boron hydride or tetramethyl diborane, diethyl boron hydride or tetraethyl diborane, di-sec-hexyl boron hydride, di-3-octyl boron hydride, di-2-decyl boron hydride, dioctadecyl boron, hydride, dicyclohexyl boron hydride, dicyclopentyl boron hydride, diphenyl boron hydride, dinaphthyl boron hydride, ditolyl boron hydride, dibenzyl boron hydride, di-2-phenylethyl boron hydride, methyl boron dihydride or dimethyl diborane, ethyl boron dihydride or diethyl diborane, 3-methyl-1-butyl boron dihydride, 4-methyl-1-butyl borbon dhydride, 3-methyl-2-butyl boron dihydride, 4-methyl-3-pentyl boron dihydride, 3-methyl-2-pentyl boron dihydride, 2-methyl-1-butyl boron dihydride, 1 2-methyl-1-pentyl boron dihydride, cyclohexyl boron dihydride, phenyl boron dihydride, benzyl boron dihydride, and the like, including analogous compounds of the polymeric boranes such as penta- and decaboranes. Cyclic boron hydride compounds are also employable as, for example, 1-hydro-boracyclopentane

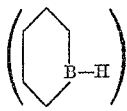

and 1-hydro-boracyclohexane. In general, such organoboron hydrides will contain up to and including about 30 carbon atoms in each organo radical and higher. Also such can be further substituted with various functional groups, particularly those which are essentially inert in the reaction system. It is preferable that the organo groups be hydrocarban moieties. As indicated above, such hydrocarbon moieties can be further substituted by various hydrocarbon groups to result in branched chain compounds. It is preferred that the organo groups be straight or branched chain hydrocarbon alkyl groups since such resulting compounds are more readily obtainable and stable.

In a particular unique embodiment of the process of this invention, it is preferred that the organo group attached to the boron via carbon be analogous in having the same number of carbon atoms and of the same configuration as the organo groups of the organoborane to be isomerized as illustrated in more detail hereinafter. In these instances, the organoboron hydride serves a dual function, that is, not only does it provide the catalytic boron-hydrogen bonded moiety to the reaction system, but the organo groups also attached to the boron in the catlyst are additionally insomerized to produce the boron-carbon linkage desired in the organoboron compound to be treated. The dialkyl boron hydrides ($R_2BH$) or tetra-alkyl diboranes, or mixtures of these, are particularly preferred as the catalyst because of their greater stability and easier handling. The branched chain alkyl boron hydrides, particularly dialkyl boron hydrides having up to and including about 10 carbon atoms in each alkyl group are especially preferred, as for example, di(2-methyl-1-butyl) boron hydride, di(2-methyl-2-butyl) boron hydride, di(3-methyl-2-butyl)boron hydride, di(2-methyl-2-pentyl)boron hydride, di(3-menthyl-2-pentyl)boron hydride, di(3-methyl-3-pentyl)boron hydride, di(2-methyl-3-pentyl)boron hydride, di(4-methyl-2-pentyl)boron hydride and di(2-methyl-1pentyl)boron hydride because of their unique stability and the greater utility of the resulting isomerized products.

The boron-hydrogen-containing catalyst which is employed in the reaction mixture can be obtained by adding diborane, pentaborane or decaborane thereto. Thus, such can be achieved by adding these boranes to the organoborane which is to be treated. Generally, when diborane is added to the organoborane, depending upon the stoichiometery employed, a portion of the organoborane to be treated is converted to the $RBH_2$ or $R_2BH$ compounds. If the organoborane to be treated is first formed by reacting diborane with an appropriate olefin, an excess of the diborane can be employed whereby the resulting organoborane will contain the necessary concentration of the boron-hydrogen moieties used as catalysts according to the present invention. Another method for the preparation of the boron-hydrogen-containing catalyst especially $R_2HB$ is to react an $R_3B$ with hydrogen. Still another method is heat $R_3B$ compounds to temperatures slightly above their decomposition temperature for a short period to form the requisite amount of $R_2BH$. While the above are preferred methods for forming the boron-hydride moiety containing catalyst, other methods for their preparation will be evident.

The organoboron compounds treated according to the process of this invention are, in general, compounds having at least one carbon to boron linkage of a carbon atom contained in a straight or branched chain having at least 3 carbon atoms and which is capable of migration of the boron to a carbon atom other than that to which it was originally attached. Among such compounds are included those having the formula

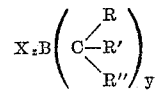

wherein R, R' and R'' can be the same or different organo radicals, preferably hydrocarbon, having up to and including about 30 carbon atoms, preferably at least 2 carbon atoms, R' and R'' can also be hydrogen; X can be oxygen, —OR or, a halide; and y can be from 1 to 3 inclusive and z can be 0 to 2 inclusive. Included in the definition of the R group, of course, are cyclic moieties with the indicated carbon atom being in the ring as, for example, cyclopentyl, cyclohexyl, and the like moieties. Typical examples of such organoboron compounds to be treated include trisisopropylborane, tri(2-butyl)borane, tri(2-pentyl)borane, tri(3-pentyl)borane, tri(3-hexyl)-borane, tri(2-hexyl)borane, tri(sec-octyl)borane, tri(4-octyl)boran, tri(sec-decyl)borane, tri(sec-tetradecyl)borane, tri(4-octadecyl)borane, tri(sec-eicosyl)borane, tri(2-methyl-1-butyl)borane, tri(2 - methyl - 2 - butyl)borane, tri(3-methyl-2-butyl)borane, tri(2-methyl-1-pentyl)borane, tri-(2-methyl-2 - penyl)borane, tri(3 - methyl - 2 - pentyl)borane, tri(2-methyl-3-pentyl)borane, tri(4-methyl-2-pentyl) borane, tri(2-methyl-3pentyl)borane, tri(4-methyl-2-pentyl)borane, tri(3-methyl-3-pentyl)borane, tri(5-pentyl-3-pentyl)borane, tri(2-cyclohexyl-4-octyl)borane, tri(ethyl-2-cyclohexyl)borane, tert-butyl boron diethyl; di(3-pentyl) boron bromide, chloride, iodide; di(3-octyl)boric acid, 3-hexyl boric acid, tert-butyl boric oxide, 4-heptyl boric oxide, 3-pentyl dimethyl boronate, 3-pentyl diphenyl boronate, di(2-hexylethyl)borinate, and the like. Cyclic boranes can also be employed such as butane-1,4-bis(1-boracyclopentane), butane-1,4-bis($\beta$-methyl-1-boracyclopentane), 1-n-butylboracyclopentane, butane-1,4-bis($\beta$-methyl-1-boracyclohexane) and the like. It is to be understood that the aforementioned and other primary, secondary, and tertiary organoboranes can be further substituted provided such substitutions are essentially inert and do not hinder the isomerization of the organoborane compound. Illustrations of particular embodiments of such substituted compounds include the hydroboration products obtained when reacting diborane with oleyl borate, methyloleate and glycerides of unsaturated acids, such as the triglyceride of oleic acid and the like. The fully alkylated boron compounds are especially preferred and particularly useful in the process of this invention. Such boron compounds in which the organo portion is hydrocarbon and alkyl having up to and including about 20 carbon atoms are more especially preferred in view of their greater availability and ease of conversion by the process. Thus, the process is particularly applicable to the conversion of secondary or tertiary organoboron compounds where the organo groups are straight or branched chain hydrocarbon alkyl groups and particularly organoboron compounds where the organo groups are hydrocarbon and an asymmetrical branched alkyl group. The process is especially applicable to the isomerization of tri(2-methyl-1-butylborane, tri(2-methyl-2-butyl) borane, tri(3-methyl-2-butyl)borane, tri(2-methyl-1-pentyl) borane, tri(2-methyl-2-pentyl)borane, tri(3-methyl-2-pentyl)borane, tri(2-methyl-3-pentyl)borane, tri(4-methyl-2-pentyl)borane, and tri(3-methyl-3-pentyl)borane, and accordingly these organoboranes are more especially preferred embodiments.

The amount of boron-hydrogen bonded moiety contained in the reaction mixture to produce the catalytic effect of this invention is subject to considerable latitude. For best results, it is preferable that the ratio of boron-hydrogen bonds to all of the boron-carbon bonds in the reaction mixture be at least 0.001. When the catalyst used is an organoborn hydride, this ratio also includes the boron-carbon bonds contained therein. Likewise, for practical reasons, the ratio of boron-hydrogen bonds to total boron-carbon bonds will be less than about 0.4 For the most efficient catalytic effect as well as practical operation, it is preferred that the ratio of the boron-hydrogen bonds to the total boron-carbon bonds be between about 0.01 to 0.1.

The temperature at which the isomerization of the organoborane is to be conducted is subject to considerable latitude and dependent somewhat upon the particular organoborane treated. In general, the temperature will vary between about 80° C. up to the decomposition temperature of the reactants or products, but preferably below 300° C. For best results in achieving effective isomerization as well as the greatest effect of the boron-hydrogen bonded catalyst as well as the supplemental catalysts employed, it has been found that temperatures between about 160 to 220° C. are most suitable. The reaction mixture is maintained at these temperature conditions for a period sufficient to affect the isomerization to the desired organoborane. Ordinarily, reaction periods up to about 24 hours are quite adequate and time between about 1 hour to 10 hours are preferred.

There is no necessity for any particular pressure conditions to be employed during the treatment. It is desirable to at least have a liquid system and, if necessary, such can be accomplished by applying a pressure to the system or using the autogenous pressure of the reaction mixture. In any event, it is preferable to avoid the presence of an excess of olefinic materials during the isomerization treatment since such tend to retard the desired isomerization by reaction with the boron-hydrogen moieties.

As illustrated by the above examples, the isomerization can be further enhanced in rate by the incorporation of other supplemental cataylsts in the reaction system in addition to the boron-hydrogen bonded catalyst referred to above. This particular combination of catalysts resuslts in even faster reaction rates and enhancement in yield of the desired isomers of the organoboron compounds treated. To illustrate the type of materials which may be used as catalysts the following list is offered, but it should be understood that the list is illustrative only and is not to be construed as limiting:

(A) Ethers, particularly saturated ethers such as the alkyl ethers, e.g. ethyl ether, diglyme

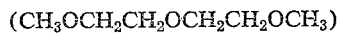

$(CH_3OCH_2CH_2OCH_2CH_2OCH_3)$ diisopropyl ether, diamyl ether, diethyl ether of diethylene glycol, dimethoxyethane, and the like; saturated cyclic ethers such as tetrahydrofuran, dioxane, etc.; and aromatic ethers such as anisole, phenetole, and the like.

(B) Inorganic esters such as the alkyl borates and silicates, e.g. trimethyl borate $[B(OCH_3)_3]$, triethyl borate, triisopropyl borate, ethyl silicate.

(C) Sulfur derivatives such as the alkyl sulfides, e.g. ethyl sulfide, methyl ethyl sulfide, tetrahydrothiophene.

(D) Nitro derivative such as the nitro alkyl and nitro aryl compounds, e.g. nitromethane, nitrobenzene.

(E) Phosphines, particularly alkyl phosphines, such as butyl phosphine, diethyl phosphine, phenyl phosphine, and especially the tertiary phosphines, such as trimethyl phosphine, triethyl phosphine, tributyl phosphine, and the like.

As can be seen from the above list, the materials which can be used as supplemental catalysts in the present invention are weak donor molecules or weak Lewis bases which are capable of forming unstable complexes or addition compounds with Lewis acids such as diborane and boron fluoride. While any Group VI-A atom could be present in the weakly basic organic compound catalyst, preferably the catalyst will contain oxygen or sulfur.

As a supplemental catalyst, the ethers have been found particularly well suited. Included among such ethers are the non-aromatic, aromatic and the polyethers. The non-aromatic ethers include the monoaliphatic and mixed ethers. Typical examples of the monoaliphatic ethers included are diethyl ether; di-n-butyl ether; di-sec-butyl ether; diisobutyl ether; di-n-amyl ether; di-n-heptyl ether; tetrahydrofuran; and the like ethers. Examples of the mixed ethers which are employed are n-amylmethyl ether; tert-amylethyl ether; n-butylisopropyl ether; ethylisoamyl ether; n-butyl-n-propyl ether; and the like. The aromatic ethers include, for example, the monoaromatic ethers, alkyl aryl ethers, and the alkaryl alkyl ethers. Typical examples of the monoaromatic ethers include dibenzyl ether, diphenyl ether; dinaphthyl ether and the like. When the aromatic ether is an alkyl aryl ether included are, for example, methyl phenyl ether; methyl-o,m or p-tolyl ether; ethylphenyl ether; ethyl-α-naphthyl ether; phenyl-n-propyl ether; isopropylphenyl ether; and the like. The alkaryl alkyl ethers which can be employed include, for example, benzylmethyl ether; benzylethyl ether; and the like. Examples of the polyethers which are employed are those having the configuration

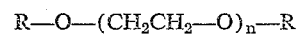

$R-O-(CH_2CH_2-O)_n-R$ wherein R is an organic radical, preferably hydrocarbon or ether radicals, and $n$ is a small whole number as between about 1 to 10, preferably 1 to 3 inclusive. For example, such polyethers include ethylene glycol ethyl methyl ether; the diethyl ether of ethylene glycol; methyl-n-propyl ether of ethylene glycol; 1,4-dioxane, tetraethylene glycol dimethyl ether; dimethoxyethane, diethyl ether of diethylene glycol; and the like. Other polyethers which can be employed include, for example, pyrocatechol dimethyl ether; resorcinol dimethyl ether; 1,2,4-trimethoxybenzene, and the like.

The foregoing are merely typical examples of the ethers which can be employed. Because of greater availability and easier handling, the liquid ethers are prferably employed. In this connection, tetrahydrofuran, diethyl ether, and the polyethers are especially preferred. Of the polyethers, the dimethyl and diethyl ether of diethylene glycol, and methyl ethyl ether of diethylene glycol are particularly preferred. It is to be understood that mixtures of the various ethers discussed previously can be employed, for example, a mixture of the diethyl ether and the dimethyl ether of diethylene glycol. Likewise, it has been found that economies can be affected while still obtaining the benefits of the ethers by their employment in admixture with other solvents or suspending media, for example, the hydrocarbons, which are particularly preferred. Typical examples of such hydrocarbons are the liquid hydrocarbons such as the nonanes, octadecanes, hexanes, toluene, benzene, xylene, and mixed hydrocarbons such as gasoline, diesel oil, and the like petroleum fractions.

The supplemental catalystic effect is obtainable when the aforementioned supplemental catalysts are employed in minor amount as about 0.01 part per part by weight of the organoboron compound treated and also when present in excessive amounts or solvent quantities as about 100 parts per part by weight of the organoboron compound. In a particularly preferred embodiment the supplemental catalyst is employed in amount between about 0.1 to 2 parts per part by weight of the organoboron compound.

Although the above examples demonstate the use of solvents, particularly the catalytic ether solvents, it is to be recognized that other solvents can be employed if desired. Included among such other solvents are the hydrocarbons and tertiary amines. Other typical examples of such solvents include the hexanes, octanes, nonanes, octadecanes, cyclohexanes, benzene, toluene, xylene and the like hydrocarbons which are essentially inert to the reactants and products. Among the tertiary amines which can be employed as solvents are included the tertiary alkyl, aryl, and cyclic amines. Typical examples of such amines include methylpyridine, amyl diphenyl amine, p-isobutyl dimethyl aniline, triphenyl amine, tricyclohexyl amine, triethyl amine, trimethyl amine, and the like. Such amines result in the formation of a complex with the organoboron compounds. Such complexes are not deleterious since the organoboron compounds can be separated therefrom by heating.

The following examples will serve to illustrate additional embodiments of the present invention.

EXAMPLE IV

Into the reactor of Example I is added 0.3 moles of 2-hexene in 95 parts of the dimethyl ether of diethylene glycol. The mixture is then reacted with 0.06 mole of diborane at room temperature whereby hydroboration takes place essentially immediately to form the tri-sec-hexylborane and the ratio of boron-hydrogen to boron-carbon bonds contained in the mixture is essentially 0.067. The mixture is then heated and refluxed for 3 hours. A yield of tri-n-hexylborane above 80 percent is obtained.

EXAMPLE V

Again employing the reactor of Example I, 0.3 mole of 2,4,4-trimethyl-2-pentene along with 95 parts of the dimethyl ether of diethylene glycol are added thereto. Diborane is bubbled into the mixture subsequent to nitrogen flushing over a period of 3 hours at room temperature leaving a boron-hydrogen to boron-carbon ratio of 0.05 present in the mixture. The reacton mixture is then heated for 2 hours under reflux conditions in the ether solution. In this manner the tri(2,4,4-trimethyl-2-pentyl)-borane is converted in essentially quantitative yield to tri(2,4,4-trimethyl-1-pentyl)borane.

EXAMPLE VI

A. Into a reactor of Example I was added 37.3 parts of tri(2-methyl-1-butyl)borane, 0.14 parts of tri(3-methyl-2-butyl) borane, and 18.9 parts of di(2-methyl-1-butyl)-boron hydride. Thus, the mixture comprised 99.62 percent of the tri(2-methyl-1-butyl) borane and 0.38 percent of the tri(3-methyl-2-butyl)borane and the boron-hydrogen to boron-carbon ratio was 0.165. This mixture was heated to 150° C. and at certain intervals an aliquot was removed which was oxidized by aqueous alkaline hydrogen peroxide solution to determine the percentage of alcohols contained in the mixture thereby describing the isomerization. The data obtained are presented in the following table.

*Table I*

| Temp., °C. | Time, min. | Ratio, B-H to B-C | Percent alcohol | | | |
|---|---|---|---|---|---|---|
| | | | I | II | III | IV |
| 148 | 0 | 0.165 | -------- | 0.38 | -------- | 99.62 |
| 150 | 5.0 | 0.165 | 1.32 | 0.66 | 0.05 | 97.97 |
| 150 | 15.7 | 0.165 | 2.98 | 0.48 | 0.04 | 96.50 |
| 150 | 38.7 | 0.165 | 3.77 | 0.82 | 0.06 | 95.35 |
| 150 | 87.9 | 0.165 | 8.94 | 0.77 | 0.03 | 90.26 |
| 150 | 163.5 | 0.165 | 15.91 | 9.91 | 0.05 | 83.13 |
| 150 | 420.0 | 0.165 | 28.08 | 0.80 | 0.04 | 71.08 |

Note.—In the above and following tables: I=3-methyl-1-butyl alcohol; II=3-methyl-2-butyl alcohol; III=2-methyl-2-butyl alcohol; IV=2-methyl-1-butyl alcohol.

Thus, the catalytic effect of the boron-hydrogen moiety contained in the mixture aided in converting the 2-methyl-1-butyl borane to 3-methyl-1-butyl borane increasing its presence from 0 to 28 percent.

(B) To further illustrate the enhanced isomerization obtained by increasing the temperature and employing a different ratio of the boron-hydrogen to boron-carbon bonds as well as a supplemental catalyst, the above procedure was repeated incorporating 50 percent by volume of the diethyl ether of diethylene glycol. The results obtained were as follows:

*Table II*

| Temp., °C. | Time, min. | Ratio, B-H to B-C | Percent alcohol | | | |
|---|---|---|---|---|---|---|
| | | | I | II | III | IV |
| 167 | 0 | 0.024 | -------- | 0.44 | 0.02 | 99.54 |
| 170 | 20.0 | 0.024 | 4.53 | 0.70 | 0.04 | 94.73 |
| 170 | 50.1 | 0.024 | 17.80 | 0.75 | 0.05 | 81.40 |
| 170 | 95.3 | 0.024 | 28.73 | 0.85 | 0.09 | 70.33 |
| 170 | 163.4 | 0.024 | 39.73 | 0.94 | 9.08 | 59.25 |
| 170 | 265.9 | 0.024 | 48.59 | 0.92 | 0.10 | 50.39 |
| 170 | 420.0 | 0.024 | 53.35 | 0.98 | 0.09 | 45.58 |

(C) When procedure (B) was repeated increasing the temperature to 190° C., the results obtained were as follows:

*Table III*

| Temp., °C. | Time, min. | Ratio, B-H to B-C | Percent alcohol | | | |
|---|---|---|---|---|---|---|
| | | | I | II | III | IV |
| 185 | 0 | 0.022 | 2.55 | 0.76 | 0.05 | 96.64 |
| 190 | 5.0 | 0.022 | 12.33 | 0.88 | 0.07 | 86.72 |
| 190 | 12.8 | 0.022 | 23.28 | 0.94 | 0.09 | 75.69 |
| 190 | 25.0 | 0.022 | 35.84 | 1.10 | 0.08 | 62.98 |
| 190 | 44.0 | 0.022 | 38.20 | 0.93 | 0.12 | 60.75 |
| 190 | 73.7 | 0.022 | 50.95 | 1.32 | 0.12 | 47.61 |
| 190 | 120.0 | 0.022 | 55.12 | 1.16 | 0.12 | 43.60 |

The latter table illustrates the equilibrium mixture which is obtained generally when isomerizing tri(2-methyl-1-butyl)borane, tri(3-methyl-1-butyl)borane, or tri(3-methyl-2-butyl)borane.

EXAMPLE VII

Mixed decenes contining 2, 3, 4, and 5 decenes, 42 parts, in 85 parts of tetrahydrofuran were treated with 1.7 parts of diborane at room temperature for 2 hours (boron-hydrogen to boron-carbon ratio of about 0.20). An 88 percent conversion to the corresopnding secondary organoboron compounds is obtained as illustrated by a duplication of the procedure and conversion to the alcohols as indicated in the above examples. At the end of the two-hour reaction period, the tetrahydrofuran was removed by distillation and a portion of the organoborane mixture was treated by refluxing in the dimethyl ether of diethylene glycol for four hours at 160 to 165° C. In this manner, a 90 percent yield of conversion of the mixed decenes to tri-n-decyl borane was obtained as indicated by conversion of an aliquot of the mixture to 1-decanol.

EXAMPLE VIII

When 100 parts of tri-sec-pentyl borane and 40 parts of di-sec-pentyl boron hydride are treated in 180 parts of diamyl ether at 150° C. and autogenous pressure for 3 hours, tri-n-pentyl borane is obtained in essentially quantitative yield.

EXAMPLE IX

When Example I-A is repeated substituting trimethyl borate, triethyl phosphine, diethyl sulfide, or nitro benzene for the diethyl ether of diethylene glycol, a faster and greater conversion of the tri(2-methyl-1-butyl)-borane to tri(3-methyl-1-butyl)borane is obtained than when such supplemental catalysts are not employed.

EXAMPLE X 2-methyl-2-butene, 7 parts, is dissolved in 45 parts by volume of a 1 molar solution of sodium borohydride in the dimethyl ether of diethylene glycol. To this mixture is added 6.4 parts of boron trifluoride-etherate at 0° C. over a period of 30 minutes. The reaction mixture is allowed to stand an additional hour at room temperature (25° C.). Then the organoborane compound is oxidized with 10.5 parts by volume of a 30 percent aqueous solution of hydrogen peroxide while keeping the pH of the reaction mixture at 8 to 10 with caustic. The alcohols so formed are extracted with ether and then analyzed by gas chromatography. Formed are 98 percent of 3-methyl-2-butanol and 2 percent of 2-methyl-2-butanol showing that 98 percent of the organoborane formed in this run has been tri(3-methyl-2-butyl)borane. By the same token, only 2 percent of the organoborane has been tri-(2-methyl-2-butyl)borane.

The above procedure is then repeated in exactly the same fashion except that prior to the oxidation step, the organoborane reaction mixture is heated to 100° C. for 120 minutes. As a result of this conversion, only 29 percent of tri(3-methyl-2-butyl)borane remained and 21 percent of tri(2-methyl-1-butyl)borane has been formed.

EXAMPLE XI

A mixture of 98 percent of tri(3-methyl-2-butyl)borane and 2 percent of tri(2-methyl-1-butyl)borane containing additionally a ratio of 0.05 boron-hydrogen to boron-carbon bonds are heated in the dimethyl ether of diethylene glycol at 100° C. for 240 minutes. Upon oxidation of the resulting mixture with aqueous alkaline hydrogen peroxide solution, a mixture of 2-methyl-1-butyl alcohol and 3-methyl-1-butyl alcohol, with minor amounts of 3-methyl-2-butyl alcohol is obtained.

EXAMPLE XII

A mixture containing 99.86 percent tri(2-methyl-1-pentyl)borane and 0.14 percent tri(2-methyl-2-pentyl)borane containing a boron-hydrogen to boron-carbon ratio of 0.0063 is heated to 188° C. in the presence of 50 percent by volume of the diethyl ether of diethylene glycol for 24 hours. Analysis of a sample of the reaction mixture by oxidation with alkaline hydrogen peroxide gave 20.0 percent 4-methyl-1-pentanol, 1.7 percent 4-methyl-2-pentanol, 0.2 percent 2-methyl-3-pentanol, and 78.1 percent 2-methyl-1-pentanol. The reaction mixture was heated an additional 122 hours in order to effect complete isomerization to the equilibrium mixture of organoboranes. Analysis by oxidation at the end of this period showed the following composition: 56.0 percent 4-methyl-1-pentanol, 3.0 percent 4-methyl-2-pentanol, 0.4 percent 2-methyl-3-pentanol, and 40.6 percent 2-methyl-1-pentanol.

EXAMPLE XIII

The procedure of Example XII was repeated, except that the boron-hydrogen to boron-carbon ratio was 0.045 and the reaction mixture was heated for 1½ hours at 173° C. Analysis by oxidation showed the following composition: 54.9 percent 4-methyl-1-pentanol, 3.2 percent 4-methyl-2-pentanol, 0.4 percent 2-methyl-3-pentanol, and 41.5 percent 2-methyl-1-pentanol. This further demonstrates the catalytic effect of the boron-hydrogen moieties.

EXAMPLE XIV

Using 50 parts of tetrahydrofuran as a conversion medium, 50 parts of di(2,3-methyl-1-pentyl)ethyl boronate containing 0.3 boron-hydrogen to boron-carbon ratio is heated to 160° C. at autogenous pressure for 4 hours. Oxidation with aqueous alkaline hydrogen peroxide solution indicates the formation of 3,4-dimethyl-1-pentanol as the primary product indicating that the boron migrates past two branches becoming affixed to the terminal olefin position during the isomerization.

EXAMPLE XV

To a reactor equipped with internal agitation, external heating means and a reflux condenser is added 15 parts of 2,3-dimethylpentene-1 in 10 parts of the methyl ethyl ether of diethylene glycol and then diborane, in slight excess of about 0.2 percent, is fed to the mixture and reacted for 1 hour at room temperature. The mixture is then heated at 150° C. for 4 hours and then oxidized and hydrolyzed as in Example X to give a high yield of alcohols containing 3,4-dimethylpentanol-1 and a lesser amount of 2,3-dimethylpentanol-1 showing boron migration past two branches from one end of the carbon chain to the other.

EXAMPLE XVI

In this run, 100 parts of tri(3-cyclohexyl-2-pentyl) borane containing 30 parts of di(3-cyclohexyl-2-pentyl) boron hydride is heated to 125° C. for 1½ hours. The resulting product is found to contain a predominant amount of tri(3-cyclohexyl-1-pentyl)borane.

Similar results are obtained when the cyclohexyl radical is substituted with radicals such as phenyl, ethyl, and tolyl in the same position in the pentyl radical.

EXAMPLE XVII

Dissolved in 40 parts by volume of a 1 molar solution of sodium borohydride in the dimethyl ether of diethylene glycol is 9.6 parts (0.1 mole) of methyl cyclohexene. Then boron trifluoride-etherate is added to the reaction mixture in amount so that a 1 percent excess of boron-hydrogen bonds is present in the reaction mixture at 20° C. and reacted for 15 minutes. The reaction mixture is then heated for 5 hours at 150° C. and then oxidized as described in Example X. Chemical analysis shows that cyclohexylmethanol has been produced.

EXAMPLE XVIII

When β-pinene is reacted with diborane at room temperature in the presence of the dimethyl ether of diethylene glycol, employing a slight excess of the diborane so that the boron-hydrogen to boron-carbon ratio is about 0.1, for ½ hour and then the resulting mixture heated to 160° C. for 3 hours and oxidized with alkaline hydrogen peroxide, dihydromyrtenol is produced in good yield with minor amounts of isopinocampheol (which would be the major product if no isomerization took place). As will be brought forth in more detail hereinafter, the primary organoborane product obtained can be reacted with ethylene or propylene at 150° C. for 2 hours to release α-pinene.

EXAMPLE XIX

Tri(3-hexyl)borane (prepared by reacting diborane in slight excess with hexene-3 at 20 to 25° C. for 30 minutes using the dimethyl ether of diethylene glycol as reaction solvent and supplemental catalyst) was oxidized as described in Example X. The resultant alcohol was 100 percent 3-hexanol. Another portion of the so-prepared tri(3-hexyl)borane in the dimethyl ether of diethylene glycol was heated for 60 minutes at 120° C.; then, the resultant organoborane subjected to the same oxidation procedure. The reaction mixture contained 41 percent 2-hexanol, 27 percent 1-hexanol, and 32 percent 3-hexanol. This shows that the tri(3-hexyl)borane was converted in large measure to tri(2-hexyl)borane prior to the oxidation. Consequently, this example demonstrates the controlled isomerization of a secondary organoborane compound into an isomeric secondary organoborane compound.

EXAMPLE XX

Employing the procedure of Example I–A, 252 parts of 3-methylpentene-2 are reacted with 16 parts (16 percent excess) of diborane in the dimethyl ether of diethylene glycol at 25° C. for ½ hour forming a mixture of tri(3-methyl-2-pentyl) borane and a minor amount of tri(3-methyl-3-pentyl) borane in the dimethyl ether of diethylene glycol. Without separation, the mixture is heated to 80° C. for 1 hour whereby a mixture of tri(3-methyl-2-pentyl)borane and tri(3-methyl-1-penyl)borane is obtained in essentially equal proportions thus demonstrating the controlled isomerization of a tertiary to a secondary organoborane. When the mixture is further heated at 170° C. for an additional 2 hours, the mixture comprises predominately tri(3-methyl-1-pentyl)borane with tri(3-methyl-2-pentyl)borane being present in lesser amount thus demonstrating the predominant conversion of secondary and tertiary organoboranes to primary and secondary organoboranes.

EXAMPLE XXI

In this run, 284 parts of oleyl alcohol is reacted with 10 parts (10 percent excess) of diborane in the dimethyl ether of diethylene glycol at 30° C. for 1 hour. The reaction mixture is then heated to 160° C. for 3 hours. At the end of this period, the mixture is oxidized and hydrolyzed by treating with aqueous alkaline hydrogen peroxide solution. In this manner, a high yield of octadecane-1,18-diol is obtained. Alternatively, if the reaction mixture is not oxidized to form the alcohols but is displaced with an olefin such as propylene as discussed more fully hereinafter, without separation from the reaction mixture, trioctadec-17-enyl borate is obtained in high yield which can be converted by hydrolysis to the corresponding octadec-17-enol.

Similar results are obtained when the above example is repeated substituting methyl oleate or the oleic acid glycerides for oleyl alcohol except that a greater amount of diborane must be employed in order to reduce the ester group to the corresponding alcohol.

The above examples are presented by way of illustration and it is not intended that the process of this invention be limited thereto. Substitution of any of the tertiary or secondary orgonoboranes or branched chain primary organoboranes in the above examples at the aforementioned temperatures and concentrations of the boron-hydrogen to boron-carbon ratios will now be evident for producing similar results. Likewise, the employment of other ethers and the like supplemental catalysts will be evident.

Some of the above examples demonstrate a particular embodiment of this invention wherein diborane (or boron hydride moieties obtained by reacting alkali metal borohydride, especially sodium borohydride, with boron trifluoride etherate) is reacted with an internal olefin or a branched chain terminal olefin and the product so produced is isomerized to various isomers in accordance with the above discussion. In general, the first step of the process, generally referred to as hydroboration of the olefin, is accomplished by bringing the reactants in contact at temperatures between about 0 to 100° C., but preferably 0 to 50° C. In this step also, a particularly preferred embodiment comprises conducting this reaction in the presence of the aforementioned supplemental catalysts, especially the polyethers since such catalyze this operation. Thus, both the first and second steps can be conducted in the same catalytic system with only an increase in temperature after the completion of the reeaction of the internal olefin with the diborane. An in situ isomerization can be accomplished by conducting the addition of the diborane to the olefin at a temperature between about 150 to 175° C. This procedure is less favorable than reacting the diborane with the olefin at 0 to 100° C. and then increasing the temperature of the reaction mixture to 150° C. and higher because undesirable side reactions take place, for example, polymerization of the olefin or diborane.

Thus, the above examples illustrate the very efficient and simple integrated process involving hydroboration and isomerization without the necessity of any separation operations and additional handling. An additional advantage which is achieved by such an integrated process is that in general the yields are greater. Thus, this type processing is very admirably suited to an integrated operation whereby the less desirable internal olefins or branched chain terminal olefins are hydroborated, then isomerized and then oxidized and hydrolyzed by conventional techniques to the more desirable primary alcohols and branched primary alcohols respectively.

The above processing is also eminently suited for integration with displacement reactions to convert the isomerized organoborane to a different organoborane releasing the more useful and particularly the terminal olefins which were previously attached to the boron atom. In general, the displacement reaction involves the treatment of the isomerized organoborane with an olefin, eespecially a terminal olefin at temperatures above about 100° C., but preferably above about 150° C., in the same reaction system obtained by the above-discussed isomerization. Generally, the olefin will be employed in amount between about 1 to 10 moles, preferably 1 to 2 moles, thereof per boron-carbon linkage in the isomerized organoborane.

In such a displacement operation, the olefin which is employed can be of greater or lesser chain length than the organo radicals attached to the isomerized organoboron compound. Surprisingly, the olefin can also have the same number of carbon atoms as do the organo radicals attached to the boron atom. Such olefins obviously will have the olefinic linkage between two carbon atoms which are different from the displaced olefins and, preferably, different from the carbon atom to which the boron atom is attached in the isomerized organoboron compound. It is preferred in this embodiment of the present invention that the olefin employed for the displacement have the same number of carbon atoms and chemical structure as do the radicals of the isomerized organoborane or have a lesser number of carbon atoms than do the organo groups attached to the isomerized organoboron compound, especially the former.

In the displacement operation, a particularly preferred embodiment again comprises conducting the displacement in the presence of the aforementioned supplementary catalysts, especially the polyethers since such also further catalyze the displacement reaction. Thus, another embodiment of the present invention comprises the aforementioned hydroboration integrated with the above-discussed isomerization and the aforementioned displacement reactions. Such processing is eminently suited to the reaction of less desirable internal or branched chain terminal olefins with diborane or boron hydride forming reagents to form the corresponding organoboranes which are isomerized to the desirable and particularly the primary organoboranes which in turn are then reacted with preferably the terminal olefins to release the desired primary olefin in high yield without ever having to separate or change the reaction systems from one step to the next. By such an integrated process, the yield of desired olefin and efficiency of the processing is greatly enhanced in contrast to conducting such operations individually.

The following example will illustrate this particular embodiment of the present invention.

EXAMPLE XXII

Employing the reactor of Example I, 9.8 parts of 3-ethyl-2-pentene is hydroborated at room temperature in the dimethyl ether of diethylene glycol with 1.52 parts of sodium borohydride and 2.72 parts of boron trifluoride in the dimethyl ether of diethylene glycol for 1 hour. Thus, a boron-hydrogen to boron-carbon ratio of 0.2 is obtained. Without separation the mixture is heated under gentle reflux for 1 hour. Then, 19½ parts of 1-decene is added into the reactor and the mixture heated under reflux in a Todd micro column, removing product olefin as it appears. Over 6 hours there is obtained about 8.0 parts of product representing a yield of about 82 percent of olefin about 98 percent of which is 3-ethyl-1-pentene and 2 percent is 3-ethyl-2-pentene as indicated by vapor phase chromatography.

Thus, the above example illustrates the highly efficient conversion of 3-ethyl-2-pentene to 3-ethyl-1-pentene by an integrated hydroboration, isomerization, and displacement. Equally satisfactory results are obtained when the example is repeated substituting, for example, 3-methylbutene-2, 4-methyl-pentene-2, 3-methyl-pentene-2, 3-methyl-hexene-2, 3-decene, 4-decene, 4-octadecene, or mixtures thereof, and the like for 3-ethyl-2-pentene; preformed diborane in place of the product obtained by reacting sodium borohydride with boron trifluoride; and 1-octene, 1-tetradecene, 1-octadecene, 1-propene, ethylene, 1-butene, and the like for 1-decene at the aforementioned conditions of hydroboration, isomerization, and displacement respectively, preferably in the presence of any of the aforementioned supplementary catalysts.

The following example will illustrate a particularly preferred embodiment of the integrated hydroboration, isomerization, and displacement readily adaptable to cyclic operation.

EXAMPLE XXIII

In this operation, in a reactor equipped with internal agitation and external heating means is added 70 parts of 2-methyl-1-butene in 90 parts of the dimethyl ether of diethylene glycol. Then, diborane is added thereto in slight excess maintaining the reaction mixture at 25° C. and the mixture reacted for ½ hour whereby tri(2-methyl-1-butyl)borane containing di(2-methyl-1-butyl) boron hydride is formed so that the ratio of boron-hydrogen to boron-carbon bonds is 0.05. The foregoing operation is employed primarily for start up purposes. The reaction mixture is then heated to 190° C. for 1 hour thereby forming the equilibrium mixture of about 55 percent tri(3-methyl-1-butyl)borane, 44 percent tri(2-methyl-1-butyl)-borane and 1 percent tri(3-methyl-2-butyl)borane which is continuously withdrawn and transmitted to a displacement reactor which is maintained at a temperature of 180° C. and sufficient pressure to maintain a predominantly liquid system while simultaneously feeding, in a ratio of 5 moles thereof per mole of the methyl butyl boranes fed to the reactor, of 2-methyl-1-butene. The mixture is continuously flowed through the displacement reactor to achieve an average residence time of about 2 hours. From the top of the reactor there is removed, in the vapor state, a mixture comprising essentially 90 percent 2-methyl-1-butene and 10 percent 3-methyl-1-butene. This stream is transferred to a 60 plate distillation column which is operated at an overhead temperature of 20.1° C. at atmospheric pressure, or the equivalent temperature at higher pressures, wherein essentially pure 3-methyl-1-butene is removed as overhead and 2-methyl-1-butene from the bottom of the column is recycled along with fresh 2-methyl-1-butene to the displacement reactor. Simultaneously, from the top of the displacement reactor a liquid stream comprising about 80 percent tri(2-methyl-1-butyl)borane and about 20 percent tri(3-methyl-1-butyl) borane is withdrawn which along with the requisite amount of di(2-methyl-1-butyl)boron hydride is transmitted to the isomerization reactor. Steady-state conditions are readily achieved to affect the continuous production of the desired 3-methyl-1-butene. Per unit time, a greater production of the desired 3-methyl-1-butene in a more efficient and economical manner is achieved by the above operation.

Alternatively, an effective method for achieving the requisite boro-hydride bonding concentration in the isomerization step is to subject the liquid stream of predominately tri(2-methyl-1-butyl)borane obtained from the displacement reactor to a rapid cracking operation for a short period of time driving off the requisite amount of hydrocarbon. While this method appears less desirable because of side reactions, in many instances it is more economical then obtaining the necessary boron-hydrogen concentration by other means such as discussed previously.

Equally efficient results are obtained when the above operation is repeated substituting 2-methyl-1-pentene or 2-methyl-2-pentene, for the 2-methyl-1-butene as the starting olefin and 2-methyl-1-pentene as the displacing olefin. Similar substitutions of starting olefins and displacing olefins in accordance with the above discussion will now be evident as well as the employment of the other conditions of start up hydroboration, isomerization and displacement.

The following example will illustrate another embodiment of this invention wherein the above described processing, especially in Example XXIII, is varied to employ, as the displacing olefin, a terminal olefin which has at least one less number of carbon atoms than does the starting olefin.

EXAMPLE XXIV

Example XXIII is repeated essentially as described with exception that in place of 2-methyl-1-butene employed as the displacing olefin, propylene is used in equivalent amount. The vapor stream from the first reactor is distilled to separate the propylene which is recycled leaving a mixture of 65 to 70 percent 2-methyl-1-butene and 35 to 30 percent 3-methyl-1-butene which is separated in a 50 plate distillation column. The liquid stream continuously withdrawn from the first displacement reactor comprises essentially tripropylborane with minor amounts of tri(2-methyl-1-butyl)borane and tri(3-methyl-1-butyl)borane. This stream is then transmitted to a second displacement reactor along with recycle 2-methyl-1-butene from the above distillation column and fresh 2-methyl-1-butene to make a total feed of 5 moles of 2-methyl-1-butene for every mole of tripropylborane. The reactor is maintained at 180° C. with an average residence time of 2 hours. From the top of this second displacement reactor the propylene is recovered and recycled to the aforementioned first displacement reactor and a liquid stream of tri(2-methyl-1-butyl)borane with minor amounts of tripropylborane and tri(3-methyl-1-butyl)borane is continuously withdrawn from the second displacement reactor for feeding into the isomerization reactor along with the requisite amount of boron-hydrogen containing moiety. When steady-state conditions are achieved, 3-methyl-1-butene is obtained in high yield per unit time.

The above type processing has the advantage of the more ready separation of the displacing olefin, namely propylene, from the organoborane and results in an enhanced proportion of the 3-methyl-1-butene in the feed to the distillation column. Similar results are obtained when the above example is repeated substituting ethylene for propylene. Likewise, it will now be evident that one can substitute in the above example other olefins to be isomerized as, for example, 3-methyl-2-pentene, 3-methyl-1-pentene, and the like for 2-methyl-1-butene under the various conditions of hydroboration, isomerization and displacement discussed hereinbefore.

The organoboron compounds produced according to the various embodiments of the present invention are of considerable utility. Some of the above examples have illustrated their conversion to alcohols by oxidizing with aqueous alkaline hydrogen peroxide solution. The alcohols are quite valuable in the production of detergents as well as plasticizers and the like uses of alcohols. Additionally, some of the above examples have demonstrated the production of more useful olefins, particularly terminal olefins from less useful internal or isomeric terminal olefins. The olefins produced are quite useful in polymerization reactions to form polymers and can be dehydrogenated to more useful diolefins. For example, 3-methyl-1-butene can be dehydrogenated by conventional techniques to isoprene. The organoboron compounds are also useful as catalysts or in catalyst formulations for the polymerization of olefins, such as ethylene, propylene, and the like at temperatures between about 50 to 200° C. and pressures up to about 5000 p.s.i. Such are particularly applicable when employed in conjunction with Group IV–B and IV–A metal halides, particularly the titanium tetra- and trichlorides. They can also be employed for reaction with metal hydrides especially of the alkali metals to form the corresponding complex alkali metal triorganoboron hydrides which are useful as selective reducing agents or which can be reacted with olefins to produce the more alkylated products as, for example, reaction of sodium tri(3-methyl-1-butyl)boron hydride with ethylene to form sodium tri(3-methyl-1-butyl)boron ethyl product. The organoboron compounds can also be reacted with certain metal salts, e.g. lead oxide, in alkaline aqueous systems to produce the desired organometal compounds, e.g. tetraorganolead, in high yields. Other uses of the products of this invention will be evident to those skilled in the art.

This application is a continuation-in-part of co-pending aplications, S.N. 738,307, filed May 28, 1958, and S.N. 857,508, filed December 7, 1959.

Having thus described the process of this invention in its various embodiments, it is not intended that it be limited except as set forth in the following claims.

I claim:

1. In a process for isomerizing isomerizable trihydrocarbon boron compounds the improvement which consists essentially of conducting said process in the additional presence of an organo boron hydride catalyst for the isomerization.

2. The process of claim 1 further characterized in that said isomerizable trihydrocarbon boron compound is a trialkylborane wherein the alkyl groups are branched chain alkyl groups and said organo boron hydride catalyst is a $R_2BH$ compound in which the R groups are alkyl analogous to the alkyl groups attached to said trialkylborane.

3. The process of claim 2 further characterized in that the reaction is conducted in the presence of an essentially inert ether.

4. The process which comprises heating tri(2-methyl-1-butyl)borane to a temperature between about 160 to 220° C. in the presence of di(2-methyl-1-butyl)boron hydride in amount such that the ratio of boron-hydrogen bonds to boron-carbon bonds is between about 0.01 to 0.1.

5. The process of claim 4 characterized in that the reaction is conducted in the further presence of the diethyl ether of diethylene glycol.

6. The process which comprises heating tri(2-methyl-1-pentyl)borane to a temperature between about 160 to 220° C. in the presence of di(2-methyl-1-pentyl)boron hydride in amount such that the ratio of boron-hydrogen bonds to boron-carbon bonds is between about 0.01 to 0.1 and in the further presence of the diethyl ether of diethylene glycol.

7. The process of claim 1 further characterized in that said organoboron hydride catalyst is present in an amount such that the ratio of boron-hydrogen bonds to boron-carbon bonds is between about 0.01 and 0.1.

8. The process of claim 1 further characterized in that said process is conducted at a temperature between about 160° C. to 220° C.

9. The process of claim 1 further characterized in that said trihydrocarbon boron compound is an isomerizable trialkylborane.

10. The process of claim 1 further characterized in that the reaction is conducted in the presence of an essentially inert ether.

11. The process of claim 1 further characterized in that said organoboron hydride catalyst is a dialkyl boron hydride.

References Cited in the file of this patent
UNITED STATES PATENTS 2,874,165    Brown _____ Feb. 17, 1959

OTHER REFERENCES

Hennion et al.: J. Am. Chem. Soc., vol. 80, pp. 617–9 (1958).